(12) United States Patent
Pappalardo et al.

(10) Patent No.: US 7,330,867 B2
(45) Date of Patent: Feb. 12, 2008

(54) METHOD AND DEVICE FOR FLOATING-POINT MULTIPLICATION, AND CORRESPONDING COMPUTER-PROGRAM PRODUCT

(75) Inventors: Francesco Pappalardo, Paterno (IT); Giuseppe Visalli, Messina (IT)

(73) Assignee: STMicroelectronics S.r.l, Agrate Brianza (IT)

( * ) Notice: Subject to any disclaimer, the term of this patent is extended or adjusted under 35 U.S.C. 154(b) by 713 days.

(21) Appl. No.: 10/737,697

(22) Filed: Dec. 15, 2003

(65) Prior Publication Data

US 2004/0181567 A1 Sep. 16, 2004

(30) Foreign Application Priority Data

Dec. 13, 2002 (IT) .......................... TO2002A1081

(51) Int. Cl.
*G06F 7/485* (2006.01)
(52) U.S. Cl. ..................................... 708/503
(58) Field of Classification Search ................. 708/503
See application file for complete search history.

(56) References Cited

U.S. PATENT DOCUMENTS 3,871,578 A    3/1975   Van De Goor et al. ...... 235/164
5,128,889 A *  7/1992   Nakano ....................... 708/497
2002/0178202 A1* 11/2002 Steele, Jr. .................... 708/503
2003/0005016 A1*  1/2003 Tzeng et al. ................. 708/628
2003/0014455 A1*  1/2003 Steele, Jr. .................... 708/503

OTHER PUBLICATIONS

Krandick, W., "Efficient Multiprecision Floating Point Multiplication with Optimal Directional Rounding," IEEE Comput. Soc., Jun. 29, 1993, pp. 228-233.
Wires, K.E. et al., "Variable-Correction Truncated Floating Point Multipliers," IEEE, vol. 2, Oct. 29, 2000, pp. 1344-1348.

* cited by examiner

*Primary Examiner*—D. H. Malzahn
(74) *Attorney, Agent, or Firm*—Lisa K. Jorgenson; Jason T. Evans; Seed IP Law Group PLLC

(57) ABSTRACT

In a method for multiplication of floating-point real numbers, encoded in a binary way in sign, exponent and mantissa, the multiplication of the mantissa envisages a step of calculation of partial products, which are constituted by a set of addenda corresponding to the mantissa. In order to reduce the size and power consumption of the circuits designed for calculation, there is adopted a method of binary encoding which envisages setting the first bit of the mantissa to a value 1, in order to obtain a mantissa having a value comprised between 0.5 and 1. Also proposed are methods for rounding of the product and circuits for the implementation of the multiplication method. Also illustrated are circuits for conversion from and to encoding of floating-point real numbers according to the IEEE754 standard. Preferential application is in portable and/or wireless electronic devices, such as mobile telephones and PDAs, with low power-consumption requirements.

12 Claims, 15 Drawing Sheets

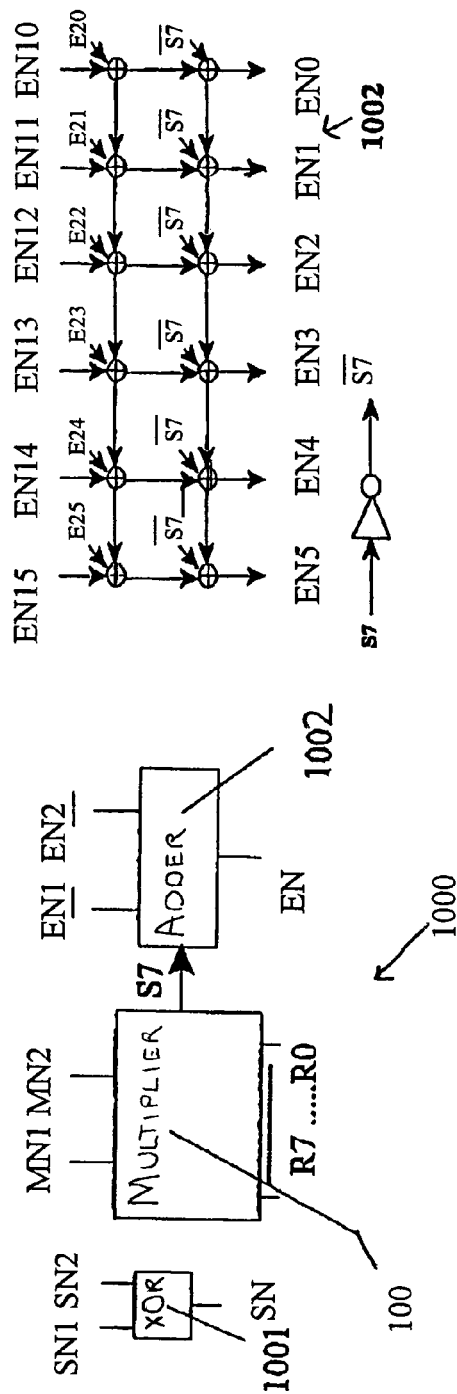
Fig. 6
Fig. 5
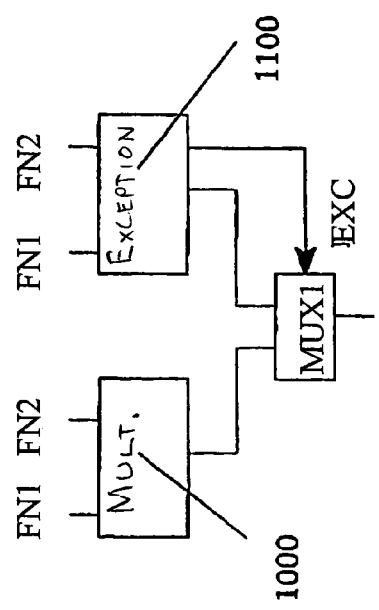
Fig. 7

METHOD AND DEVICE FOR FLOATING-POINT MULTIPLICATION, AND CORRESPONDING COMPUTER-PROGRAM PRODUCT

BACKGROUND OF THE INVENTION

1. Field of the Invention

The present invention relates to techniques for automatic execution of operations of multiplication, i.e., to techniques for generating, starting from at least one first binary digital signal and one second binary digital signal representing respective factors to be multiplied together, an output signal representing the product of these factors.

The invention has been developed with particular attention paid to its possible application to the multiplication of floating-point real numbers, with a view to its use in devices such as, for example, low-power-consumption electronic devices, in particular portable wireless devices.

2. Description of the Related Art

The arithmetic logic units (ALUs) of electronic devices traditionally comprise multiplication units for floating-point numbers. These are typically circuits which, starting from a first binary digital signal and a second binary digital signal representing respective factors to be multiplied, expressed in floating-point format, generate an output signal, which is also expressed in floating-point format and represents the product of the factors multiplied together.

For reasons of clarity and simplicity of illustration, in the remainder of the present description, both in discussing the solutions of the known art and in presenting possible embodiments of the invention, exclusive reference will be made to the multiplication of two factors. What has been said with reference to the multiplication of two factors extends, however, also to multiplications involving more factors.

In the framework of units for floating-point multiplication, by far the most widely used representation is the one envisaged by the standard IEEE754. According to this standard, real numbers are expressed via a binary representation of the fractional part or mantissa and of the exponent in powers of a base 2, according to the general formula:

$$f = \sum_{i=-K}^{K} a_i \cdot 2^i \qquad a_i \in \{0, 1\} \tag{1}$$

where f is the real number to be represented, and K is the number of bits available for the representation.

A number represented in the floating-point form comprises three basic components: sign SGN, exponent E, and mantissa M.

According to the IEEE754 standard, it is possible to adopt a representation in single precision of the real number f, using: a number NS, equal to one, of sign bits SGN; a number NE, equal to 8, of exponent bits E; and a number NM equal to 23, of mantissa bits M.

Alternatively, it is possible to adopt a double-precision representation, where NS has the value 1, NE has the value 11, and NM has the value 52.

In this way, the mantissa M and the exponent E are represented by means of two respective integer values.

The sign bit SGN is always just one and assumes the value "0" to indicate a positive number, and the value "1" to indicate a negative number.

For the exponent E there is adopted a representation that envisages adding a fixed value, referred to as "bias", to a base exponent exp. For example, if the base exponent has the value 73 and the bias value is 127, the encoded exponent E has the value 200.

The bias value is fixed and assumes the value 127 in single precision and the value 1023 in double precision. The adoption of the fixed bias value means that the lowest number will be represented in the exponent by a series of zeroes in binary form, whilst the highest one will be represented by a series of ones.

According to the IEEE754 standard, there is moreover adopted a so-called normalized representation of the real number f according to the formula:

$$f = (-1)^{SGN} * (1.0 + M) * 2^{(E-bias)} \tag{2}$$

The convention on normalized numbers envisages, that is, that the first bit upstream of the point will always have the value one, and all the bits downstream of the point will be used for representing the mantissa M and will increase the precision.

Summing up, the rules for encoding a real number according to the IEEE754 standard are the following:

the sign bit SGN has the value "0" for indicating a positive number and "1" for indicating a negative number;

the base of the exponent E is 2;

the field of the exponent E is obtained by adding the value of the exponent exp to a fixed bias value; and the first bit of the mantissa M is always one and hence is not represented explicitly.

The IEEE754 standard moreover adopts a representation, termed "denormalized representation", when the real number f has exponent zero and mantissa other than zero. This notation is used for representing the real numbers very close to zero.

$$f = (-1)^{SGN} * 0.M * 2^{(-bias-1)} \tag{3}$$

In this case, that is, there is not, hence, a one set before the mantissa M.

In brief, the IEEE754 standard envisages the use of two encodings:

a denormalized encoding for numbers very close to zero; and a normalized encoding in all the other cases.

This double representation calls for adding the bias in the exponent in order to distinguish the two cases (denormalized if EXP=0)

1.xxxxx . . . x normalized form; and 0.xxxxx . . . x denormalized form, which, under due analysis, represents the weak point in the perspective of a low power-consumption multiplier device.

The reason for this is that, in the denormalized case, there does not exist the guarantee that the product of the mantissas is made between two "big" numbers.

It will moreover be appreciated that the term "normalized" is applied because the real number with the most significant bit is normalized to one.

With the above rules, by encoding the real number f using a sign bit NS, a number NM of bits for the mantissa and a number NE of bits for the field of the exponent, we obtain, for example, as regards the range of variation, a maximum positive value Nmax:

$$NMax = \sum_{i=0}^{NM} 2^{-i} \cdot 2^{bias} \qquad (4)$$

Other characteristics of the encoding according to the IEEE754 standard regard the zeroes, which is not represented in normalized form, on account of the presence of the one as first mantissa bit. The zero is expressed with a special value with a field of the exponent zero and mantissa zero.

The IEEE754 standard moreover envisages specific encodings to indicate infinite values, indeterminate values and errors (NaN codes).

In order to make a multiplication between floating-point numbers defined in mantissa M and exponent E according to the encoding envisaged by the IEEE754 standard, there is hence necessary an operation of addition on the exponents of the operands, whilst there is required an operation of product for their mantissas.

The multiplication between real numbers expressed according to the IEEE754 standard, in particular with reference to the number of bits necessary for the exponent and mantissa, hence requires—for a "canonical" embodiment—the use of arithmetic logic units with characteristics of complexity and power absorption that are far from compatible with the conditions of use typical of portable electronic devices, such as mobile phones and PDAs.

In order to deal with the problem, a possible solution could be a reduction of the number of bits used for representing the exponent and, in particular, for representing the mantissa. This approach would lead, however, to an undesirable loss of precision in obtaining the result.

It is moreover necessary to consider the fact that, for the calculation of floating-point products, there are normally used integer multiplier circuits, such as partial-sum multiplier circuits. These multiplier circuits are based upon the calculation of the partial sums of partial products calculated by a logic circuit based upon a matrix, such as the one represented in FIG. 1.

In the specific case of 4-bit integers, such a matrix logic circuit consists of a matrix of AND logic gates, which receives on the rows the bits A0 . . . A3 of the mantissa of an operand and on the columns the bits B0 . . . B3 of the mantissa of the other operand, supplying addenda of partial products P1 . . . P16, corresponding to the product of bits A3B0 . . . A0B3, ordered according to rows and columns. Subsequently, there are performed partial sums of the partial sums on the rows of the matrix, on the columns or else on the diagonal.

In this case, the area occupied by the circuit and its power consumption depend basically upon the number of the rows or of the columns that it requires.

Alternatively, in multiplication units there is also used the so-called Booth algorithm for multiplication.

An integer Y can be expressed as a sum of powers of a base 2 with coefficients $y_i$:

$$Y = y_0 2^m + y_1 2^{m-1} + y_2 2^{m-2} + \ldots + y_{m-1} 2 + y_m \qquad (5)$$

It hence follows that a product U between a multiplicand number X and the integer Y can be expressed as:

$$U = XY = \sum_{i=0}^{m} (y_{i+1} - y_i) \cdot X \cdot 2^{m-i} \qquad (6)$$

A multiplication can hence be made by getting the arithmetic logic unit to perform repeated operations of addition and shift on the multiplicand X, as indicated in Table 1 appearing below, which represents the rules of the so-called Booth algorithm 1:

TABLE 1

| $Y_{i+1}$ | $y_i$ | Arithmetic operation |
|---|---|---|
| 0 | 0 | 0 |
| 0 | 1 | -X |
| 1 | 0 | X |
| 1 | 1 | 0 |

The adoption of the Booth algorithm, albeit advantageous in so far as it leads to a sensible increase in the processing speed, does not lead to an economy in terms of power absorbed by the circuits and in terms of area occupied thereby.

BRIEF SUMMARY OF THE INVENTION

An embodiment of the present invention provides a technique for the multiplication of floating-point real numbers that will enable a reduction in the power-consumption levels and overall dimensions of the circuit without thereby degrading appreciably the performance in terms of error rate and processing speed.

Embodiments of the invention are directed to a method and a corresponding device, as well as to the corresponding computer-program product which can be directly loaded into the memory of a digital processor and comprises software code portions for implementing the method according to the invention when the product is run on a computer.

Basically, one solution according to the invention envisages the real number being normalized to 0.5, by resorting to a "completely normalized" representation because there are no other encodings in the representation (for example denormalized numbers in the case of the IEEE754 standard).

An embodiment of the invention, which can be implemented, for example, in arithmetic logic units of processors for portable wireless electronic devices, envisages adopting a representation of the mantissa and of the exponent that uses a smaller number of bits, as well as adopting a non-exact multiplication method that makes use of the particular representation of mantissa and exponent for rounding the results, at the same time maintaining an error rate (understood as margin of imprecision in the determination of the result of the multiplication) sufficient for ensuring good operation of the devices in which the corresponding solution is applied. These devices may be, for example, decoders, such as decoders for Viterbi decoding (SOV) of convolutional codes and/or filters of various nature, such as, for example, filters of an autoregressive type for noise filtering.

The solution described herein may be applied also to the Booth algorithm (or, rather, algorithms) provided that:
the mantissa and sign are encoded in twos complement in a single field; the Booth algorithm works, in fact, with integers with sign in twos complement, whilst the IEEE754 standard and the solution described herein encode in modulus and sign on two distinct fields;
a variant of the Booth algorithm is used in the case of integers without sign.

BRIEF DESCRIPTION OF THE DRAWINGS

The invention will now be described, purely by way of non-limiting example, with reference to the annexed drawings, in which:

FIG. 5 represents the block diagram of a device that implements the method according to the invention;

FIG. 6 represents a detail of the device of FIG. 5;

FIG. 7 represents the block diagram of a circuit that can be associated to the device of FIG. 5;

DETAILED DESCRIPTION OF THE INVENTION

Basically, the technique described herein envisages use of a binary encoding of real numbers different from the one envisaged by the standard IEEE754.

Said different binary encoding of real numbers envisages representing a real number, its encoded form being in what follows designated by the reference FN, using a number MA of bits for a mantissa or fractional part MN and a number EA of bits for an exponent EN, in a form that, as has been seen, is "completely normalized", since it envisages that the real number will be normalized to 0.5.

In the solution described herein:

the exponent EN is encoded in twos complement expressed in base two;

the first bit of the mantissa MN, i.e., the bit with weight $2^{-1}$, has the always value one; in this way, the encoded real number FN has always a mantissa MN that assumes values comprised between 0.5 and 1, whilst the residual value is transferred onto the exponent EN.

The mantissa MN defined herein can be expressed as:

$$MN = \sum_{i=1}^{MA} b_i \cdot 2^{-i} \text{ where } b_1 = 1 \qquad (7)$$

Hence, according to this formalism, we will have, for example:

| | |
|---|---:|
| 2 is converted into | 0.5 and $2^2$ |
| 3.1 is converted into | 0.775 and $2^2$ |
| 0.7 is converted into | 0.7 and $2^0$ |
| 4.9 is converted into | 0.6125 and $2^3$ |

The coefficient $b_1$—set to the value one in the mantissa MN—is used, even though it is redundant, for representing the value zero.

Other particular values in the method according to the invention are the following:

Zero: mantissa MN and exponent EN zero;

Infinite: the bits of mantissa MN and of exponent EN are equal to one;

NaN: mantissa equal to zero and exponent other than zero.

The technique described herein is based upon the observation that multiplication according to the IEEE754 standard entails multiplying the mantissa via exact integer product, subsequently using rounding techniques to correct the result represented by the most significant bits of the integer product.

The technique described herein defines, instead, the mantissa MN in such a way that it will always assume "high" values, in particular comprised between 0.5 and 1 so that the product of mantissas can be calculated via an operation of multiplication based upon a non-exact algorithm, which uses for the calculation the partial products such as to determine the most significant part of the resulting mantissa or product mantissa. This brings about an operation of truncation with respect to the use of an exact algorithm. Since the value of the mantissa is always high as compared to the truncated least significant part of the product, it is possible to obtain low error rates.

Figure 1:
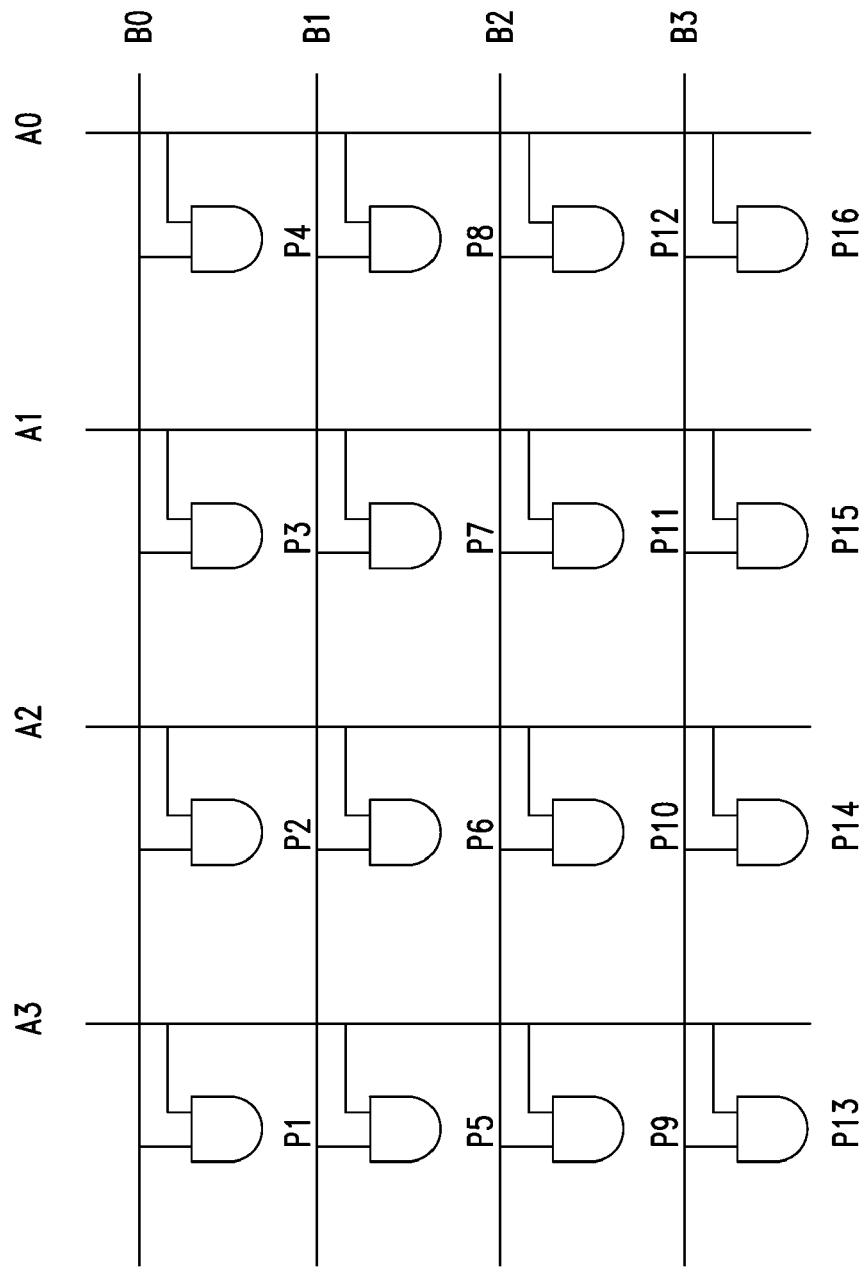
FIG. 1, corresponding to the known art, has already been described previously.

To process the addenda of the partial products thus selected there can then be used traditional partial-sum architectures, such as the one described with reference to FIG. 1 or architectures implementing the Booth algorithm. In fact, both types of architectures require performing a sum on the partial products.

If the number MA of bits of the mantissa MN is eight, the worst case is the multiplication of 128 by 128: in fact the mantissa MN has the value 0.5. The multiplication of integers produces a number of bits equal to 2×MA, but, according to the technique illustrated herein, just the top part or most significant part of the quantity that said bits represent is of interest.

A further aspect of the solution illustrated herein therefore consists in considering for the operation of multiplication only the bits of the partial products contained in a window W of pre-set amplitude.

Figure 2:
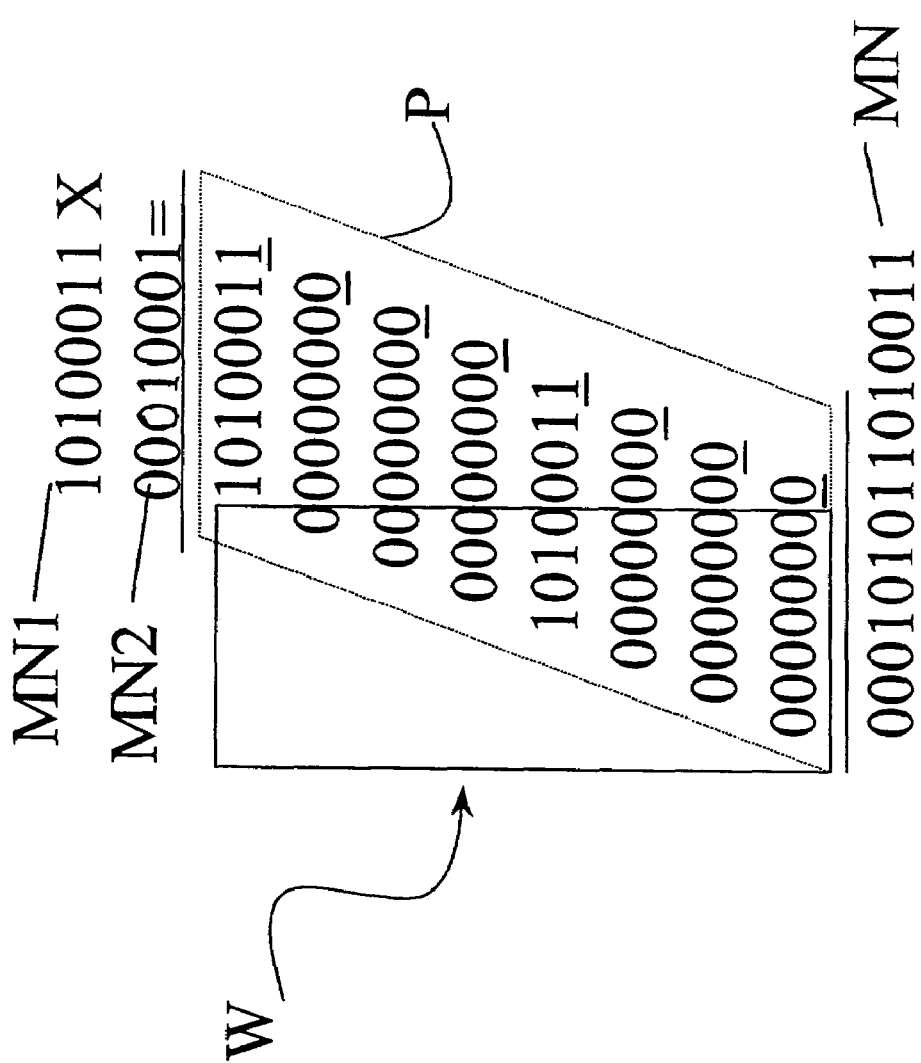
FIG. 2 represents an operation of multiplication according to a possible embodiment of the invention.

FIG. 2 represents an operation of multiplication of a first 8-bit mantissa MN1 (the multiplicand) with a second 8-bit mantissa MN2 (multiplier), which will be assumed as being received in corresponding registers.

The operation of binary multiplication entails multiplying the mantissa MN1 separately for each of the bits of the mantissa MN2, so determining eight multiples of the mantissa MN1, referred to as partial products, which are then appropriately arranged in columns and summed up to obtain a resulting mantissa MN, which is the product of the mantissas MN1 and MN2. Each partial product consists of addenda, each of which is the product of just two bits. There are eight addenda per partial product in the case represented. The addenda constitute a set of addenda P.

The resulting mantissa MN is made up of fifteen bits.

The technique described herein requires only eight bits, according to the representation chosen. The eight bits of the resulting mantissa MN are calculated via the partial sums of the addenda of the set P contained in the window W alone, the said window W having a predetermined amplitude. This amplitude is evaluated in terms of the number of bits of the significant part that it is desired to preserve; in the case of FIG. 2, the amplitude of the window W is seven bits and the eighth bit is the one furthest to the left, obtained as the carry of the previous sums: see, in this connection, also the unit 22 that produces said bit operating only on the carries of the previous sums—illustrated in FIG. 9, which will be described in what follows.

The above procedure is irrespective of the criterion according to which the partial products are summed. Hence, the method can be applied to methods based upon the partial sums of the partial products, as well as to the calculation of the coefficients according to the Booth algorithm.

A further aspect of the solution described herein is linked to the adoption of specific measures for rounding the truncation error of the integer product referred to the mantissa.

In particular, illustrated herein are a method of rounding by columns and a method of rounding by rows.

Figure 3:
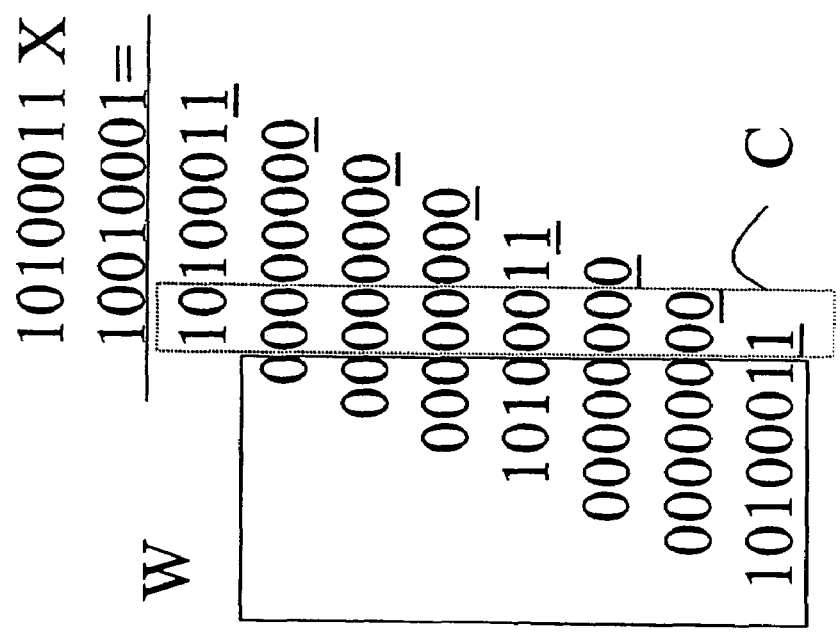
FIG. 3 represents a first method of rounding that can be applied in the context of the invention.

FIG. 3 represents the method of rounding by columns of the truncation error on an operation of multiplication, illustrated in a similar way as for FIG. 2, i.e., showing the set of partial products.

According to the method of rounding by columns, there is performed a bit-by-bit OR operation referred to each of the columns in a window C outside the window W used for selecting the addenda of the set P to be used for the partial sums. If the result of said bit-by-bit OR operation on the addenda of each column belonging to the window C is one, one is added to the final sum.

As may be seen, in FIG. 3, the window C comprises only the two columns corresponding to the most significant bits of the part that is truncated, i.e., the two columns immediately adjacent to the ones contained in the window W.

Figure 4:
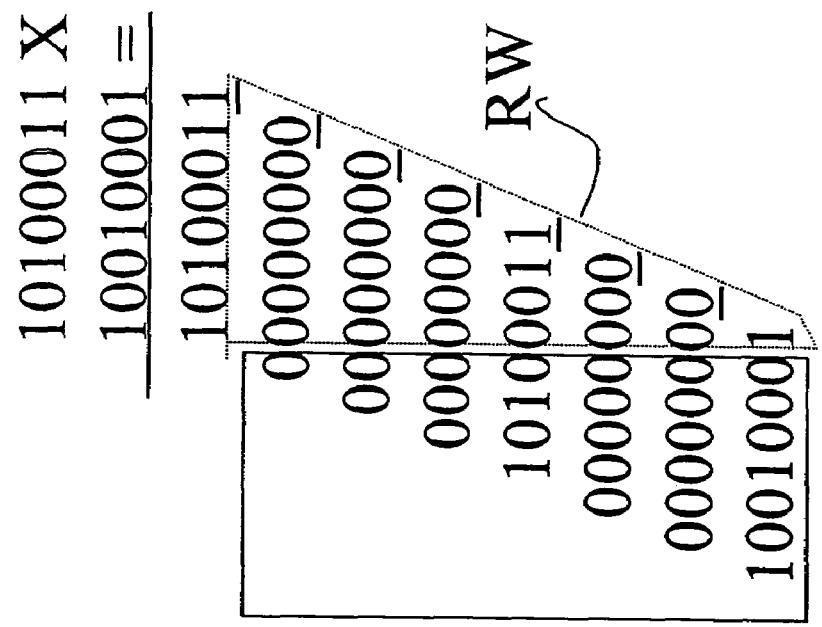
FIG. 4 represents a second method of rounding that can be applied in the context of the invention.

FIG. 4 represents the method of rounding by rows of the truncation error.

According to the method of rounding by rows, there is performed a bit-by-bit AND operation referred to each row included in the window RW outside the window W used for selecting the addenda P to be used for the partial sums. If the generic row has all values one, one is added to the adder pertaining to that row.

It will therefore be appreciated that rounding by rows is irrespective of how the partial products are summed up (i.e., whether by rows—unit 86—or by columns—unit 87). Again, not necessarily must the window where rounding is carried out, RW, which is external to the window W, be complementary to W, i.e., such that (W)U(RW) is equal to the totality of the partial products.

The technique described herein can hence assume at least four forms:
multiplication method with partial sums of the partial products without rounding;
multiplication method with partial sums of the partial products associated to the method of rounding by columns;
multiplication method with partial sums of the partial products associated to the method of rounding by rows; and
multiplication method with treatment of the partial products according to a Booth algorithm.

The multiplication method that uses partial sums of the partial products can in turn perform said operation of partial sum by rows or by columns, the partial sum by rows being the fastest.

Appearing below in Table 2 are values corresponding to the encumbrance, power consumption, error rate and speed evaluated in terms of WNS (Worst Negative Slack) of the various possible architectures of the multiplication units according to the invention considered previously.

TABLE 2

|  | Area ($\mu m^3$) | Consumption (nW) | Max Err % | WNS (ns) |
| --- | --- | --- | --- | --- |
| Sum by columns without rounding | 1448 | 17.51 | 5.03 | 1.11 |
| Sum by columns with rounding by columns | 1662 | 33.75 | 4.2 | 1.02 |
| Sum by columns with rounding by rows | 2073 | 40.7 | 4.01 | 1.17 |
| Sum by rows without rounding | 1682 | 28.29 | 5.03 | 0.39 |
| Sum by rows with rounding by columns | 1984 | 40.81 | 4.2 | 0.38 |
| Sum by rows with rounding by rows | 2134 | 31.18 | 4.01 | 0.39 |
| Booth 2 (comparison example) | 6182 | 169.35 | 2.75 | 0.05 |

As may be seen, the technique proposed herein is not the best in terms of speed. The possible use in an architecture of a pipeline type, which enables calculation of more than one product for each cycle, enables an improvement of performance in terms of speed for the applications in which this factor is particularly significant.

FIG. 5 illustrates a first example of a multiplication device implementing one embodiment of the method for multiplication of floating-point numbers according to the invention.

If FN1 is a first real floating-point number with sign SN1, mantissa MN1 and exponent EN1 encoded according to the technique described herein, and FN2 is a second floating-point number with sign SN2, mantissa MN2 and exponent EN2 encoded according to the technique described herein, the reference number 1000 designates a multiplication unit, which receives at its inputs the numbers FN1 and FN2.

Figure 10:
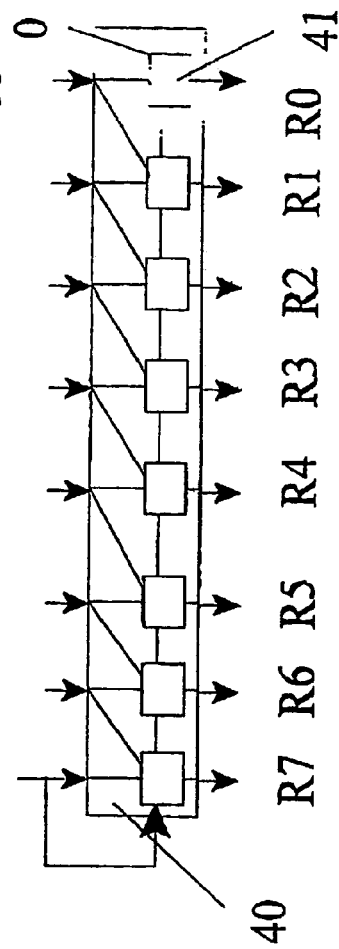

The multiplication unit 1000 is made up of a number of modules, namely:
designated by the reference number 1001 is a module that receives at its inputs the sign bits SN1 and SN2 and supplies at output the resulting sign bit SN;
designated by the reference number 1002 is a module that receives at its inputs the exponents EN1 and EN2 and supplies at output the resulting exponent EN;
designated by the reference 100 is a multiplication module that receives at its inputs the mantissas MN1 and MN2 and supplies at output the resulting mantissa MN, i.e., the product, by applying the method described herein; the resulting mantissa MN is constituted by corrected partial sums R7 . . . R0, the meaning of which will be described in greater detail in what follows, in particular with reference to FIG. 10.

The module 1001 simply performs a XOR operation on the sign bits SN1 and SN2.

The module 1002 comprises a simple adder that performs the following operations:

$EN1+EN2$ if $S7=1$ $EN1+EN2-1$ if $S7=0$ where S7, as will be specified in greater detail in what follows, is the value of the most significant bit of a set of partial sums S1 . . . S7 and is supplied by the module 100 to the module 1002.

FIG. 6 represents in detail the diagram of operation of the adder that implements the module 1002. Indicated by EN10 . . . EN15 are the bits of the exponent EN1 and by EN20 . . . EN25 are the bits of the exponent EN2. As may be noted, the bit S7 is sent negated to the module 1002 so as to be used for subtracting one from the sum of EN1 and EN2.

A further exception module 1100 can be associated to the multiplication unit 1000 represented in FIG. 5 in order to solve the cases in which the operand is an infinite value or a NaN value.

The exception module 1100 is connected in parallel to the unit 1000, as shown in FIG. 7, and their outputs are sent to a multiplexer MUX1, which selects the output according to the value of an exception signal EXC supplies by the exception module 1100 itself.

The exception module 1100 is obtained via a combinatorial network, which verifies whether the numbers FN1 and FN2 are infinite values or NaN.

Figure 12:
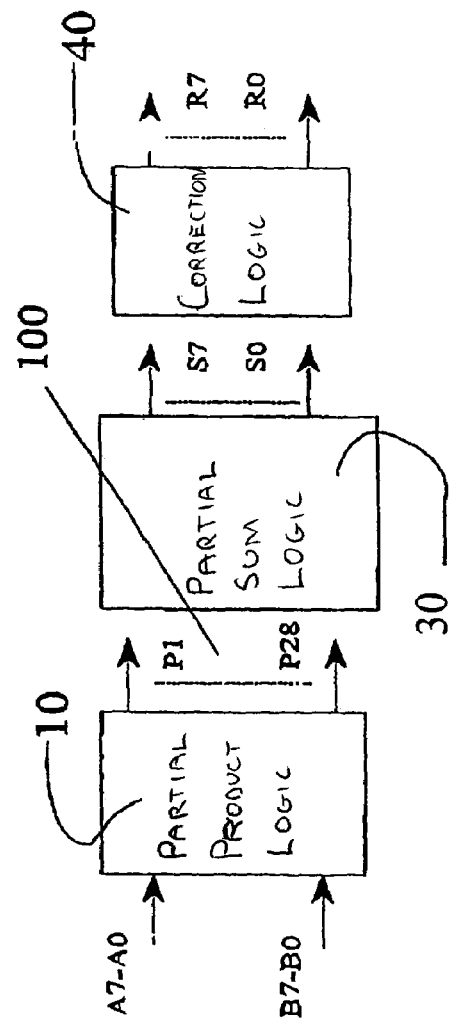

FIG. 12 represents the block diagram of a multiplication module 100, in which designated by 10 is a block representing a matrix logic circuit for generating partial products, which receives at input bits A7 . . . A1 of the mantissa MN1 and bits B1 . . . B7 of the mantissa MN2 and supplies at output, to a block 30, addenda of the partial products P1 . . . P28.

The block 30 is designed to perform operations of partial sum on the addenda of the partial products P1 . . . P28 and supplies at output partial sums S0 . . . S7 to a block 40, which is designed to perform a correction step of the partial sums S7 . . . S0 and supplies corrected partial sums R0 . . . R7.

Figure 8:
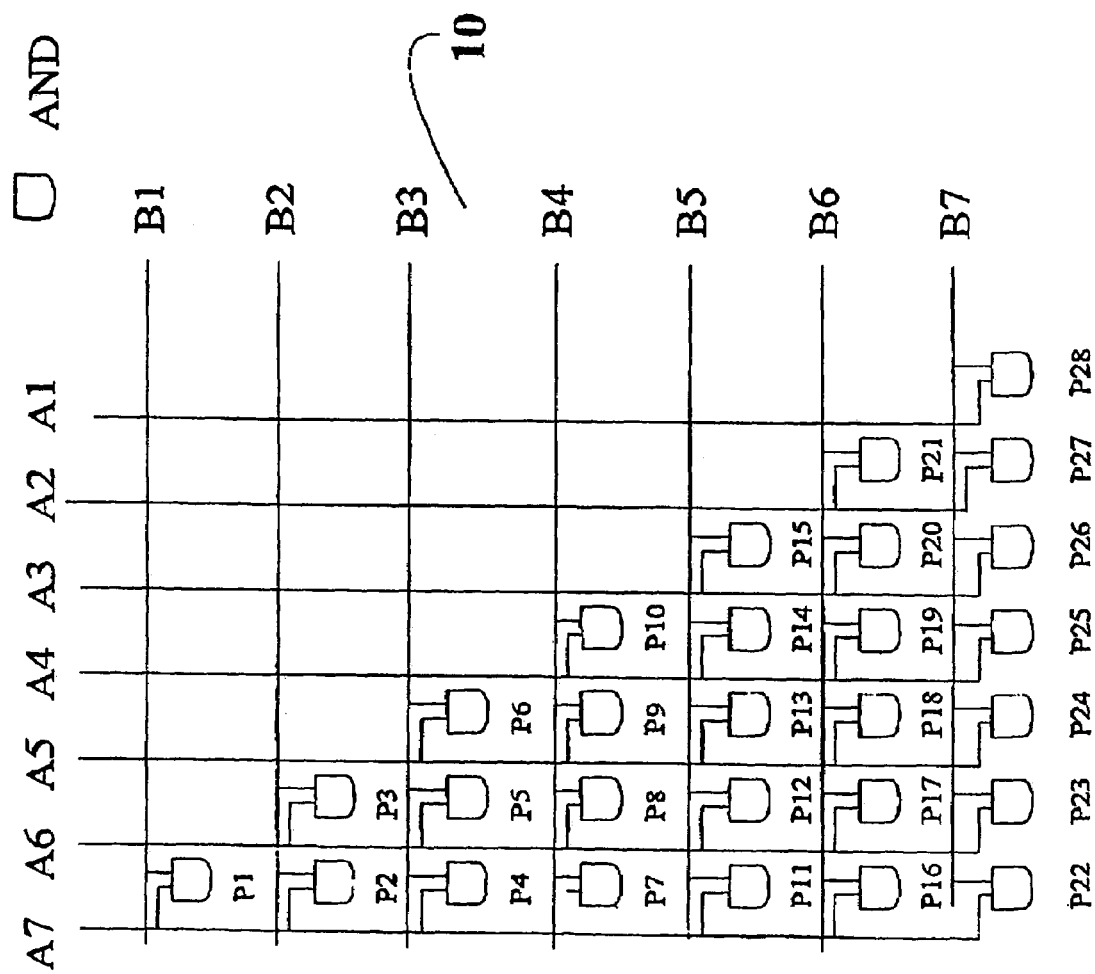
FIGS. 8 to 12 represent in greater detail the device of FIG. 5.

FIG. 8 represents the matrix logic circuit 10, which is designed to generate the addenda of the partial products P1 . . . P28.

The circuit 10 receives at input the bits A7 . . . A1 of the mantissa MN1 on the columns and the bits B7 . . . B1 of the mantissa MN2 on the rows. Columns and rows of the circuit 10 form the inputs of AND gates that supply the products P1 . . . P28.

Since the technique described herein envisages using for calculation a subset of the set P of addenda of the partial products contained in a window W of predetermined amplitude and corresponding to the most significant part of the product, the circuit 10 is conceived with an already conveniently reduced structure, i.e., provided just with the gates necessary for calculating the addenda of the partial products comprised in the subset identified by said window W.

It may be readily verified that the diagonals of the matrix of the circuit 10 correspond to the columns comprised in the window W in the representation of the operation of multiplication of FIGS. 2, 3 and 4.

Figure 9:
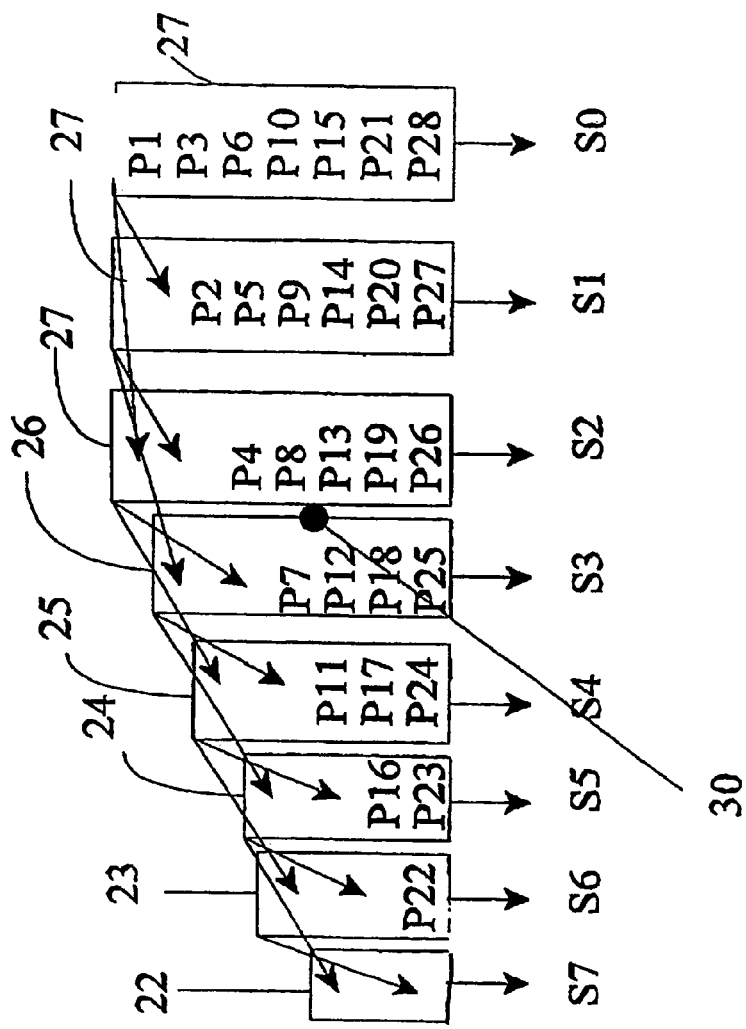

FIG. 9 represents the block 30, which is basically formed by a parallel adder structure comprising a plurality of adders designated by the references 22 to 27 for performing the sum by columns of the addenda of the partial products P1 . . . P28 supplied by the circuit 10.

The adder 22 is a modulo-2 adder, which sums two bits at input and supplies two bits at output. The adder 23 is a modulo-3 adder, which sums three bits at input and supplies two bits at output. The adder 24 is a modulo-4 adder, which sums four bits at input and supplies three bits at output. The adder 25 is a modulo-5 adder, which sums five bits at input and supplies three bits at output. The adder 26 is a modulo-6 adder, which sums six bits at input and supplies three bits at output. The adder 27 is a modulo-7 adder, which sums seven bits at input and supplies three bits at output.

Each adder sends its own output bits, i.e., the result of the operation of addition on the addenda of the partial products, at input to the adjacent adders, except for the output least significant bit or LSB, which is supplied as the result of the operation of partial addition. For example, the modulo-4 adder 24, which has three output bits, supplies the first two significant bits respectively to the adder 23 and to the adder 22, whilst the least significant bit constitutes the partial sum S5.

As already mentioned previously, each adder 22 to 27 operates on the addenda of the partial products lying on a diagonal of the matrix of the circuit 10.

Thus, for example, the modulo-7 adder 27 operates on the addenda P1, P3, P6, P10, P15, P21, P28 for supplying the partial sum S0, whilst S6 is supplied by the modulo-3 adder 23 which operates just on the product P22, and the modulo-2 adder 22 does not have at its input addenda of partial products, but only the bits at output from the adders 23 and 24.

The partial sum S7, as already seen with reference to FIG. 5, has also the function of driving the calculation of the exponent in the module 1001.

The partial sums S7 . . . S0 are sent to one-bit multiplexers 41 belonging to a block 40, represented in FIG. 10, which carries out a correction on the partial sums S7 . . . S0 to supply the corrected result R7 . . . R0 according to the value of the sum S7. Said block 40, as has been said, is hence a simple one-bit multiplexer controlled by the bit of the partial sum S7. If the partial sum S7 is equal to zero, certainly the partial sum S6 has the value one; hence, the block 40 performs a shift to the left of the bits S7 . . . S0. If the partial sum S7 has the value one, then the result is left unchanged.

Figure 11:
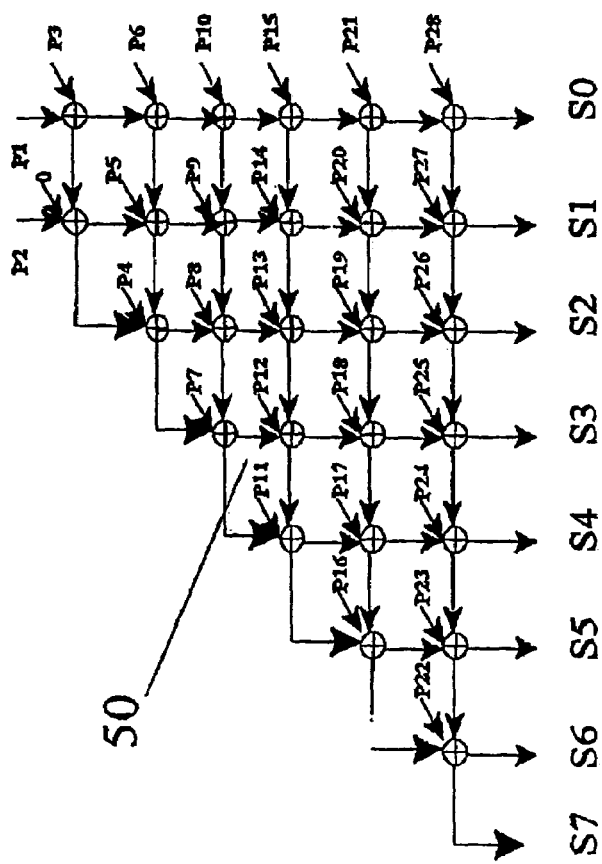

FIG. 11 represents, by means of a schematic representation of its adder network, a module 50, alternative to the circuit 30 used in the module 100, which performs the sum of the partial products by rows.

Figure 13:
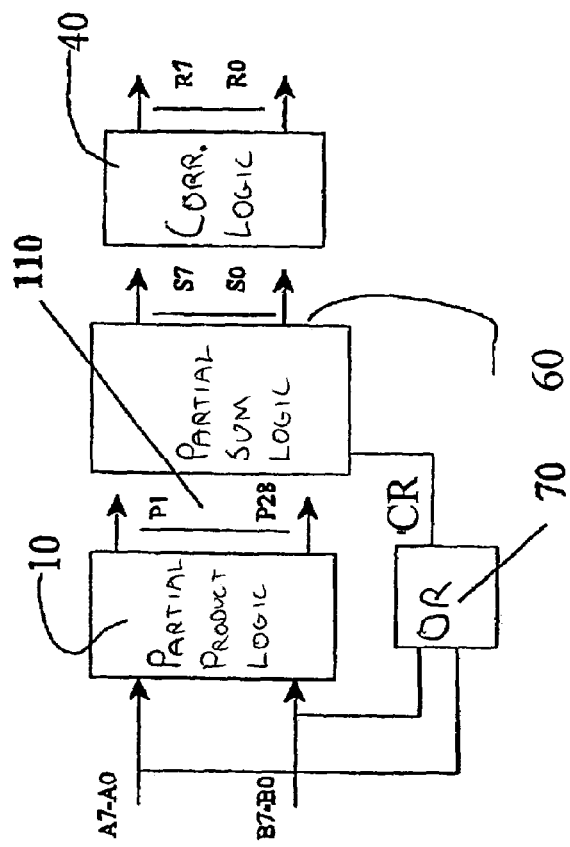
FIGS. 13 to 15 and 19 represent in greater detail a device that implements the method exemplified in FIG. 3.

In FIG. 13 designated by 110 is a module that, with respect to the module 100 of FIG. 12, implements the method of rounding by columns.

Said module 110 comprises the block 10, which receives the bits A7 . . . A0 and B7 . . . B0 and supplies the addenda of the partial products P1 . . . P28 to a block 60, which, like the block 30, carries out the partial sums.

The bits A7 . . . A0 and B7 . . . B0 are however sent in parallel also to a block 70, illustrated in detail in FIG. 19. The block 70 performs the operation of rounding on the columns, as mentioned with reference to FIG. 2, i.e., performs a bit-by-bit OR operation on the columns and supplies a carry signal CR to the module 60 that performs the partial sums.

Figure 19:
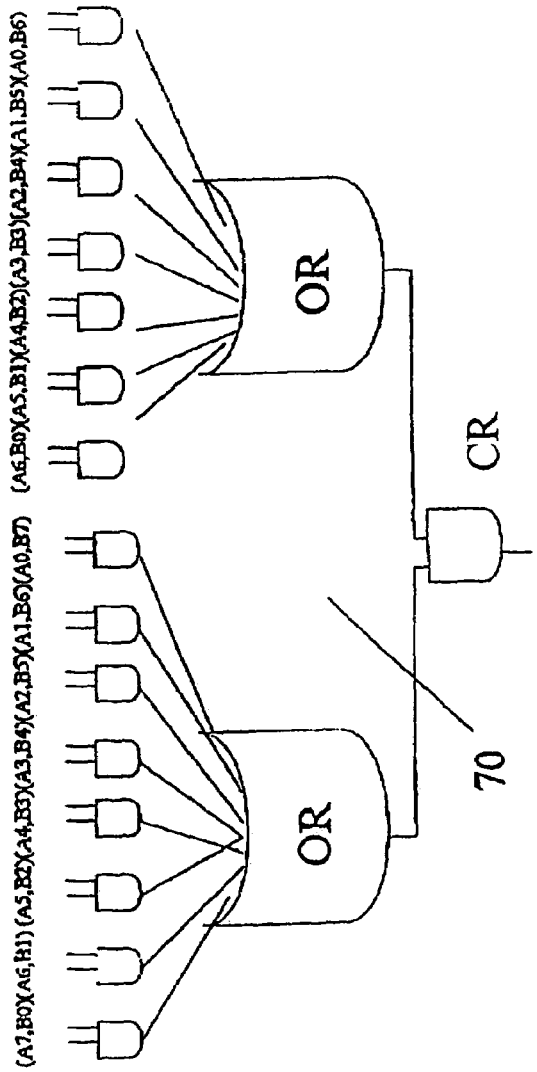

As may be seen from the diagram of FIG. 19, the block 70 comprises a first array of AND gates for calculating the addenda that form the two columns selected in the subset identified by the window C in FIG. 3.

Next, two OR gates execute the one-bit OR operation on the addenda of the two columns, and from the outputs of said OR gates, which are sent to an AND gate, the carry signal CR is obtained to perform the rounding.

Figure 14:
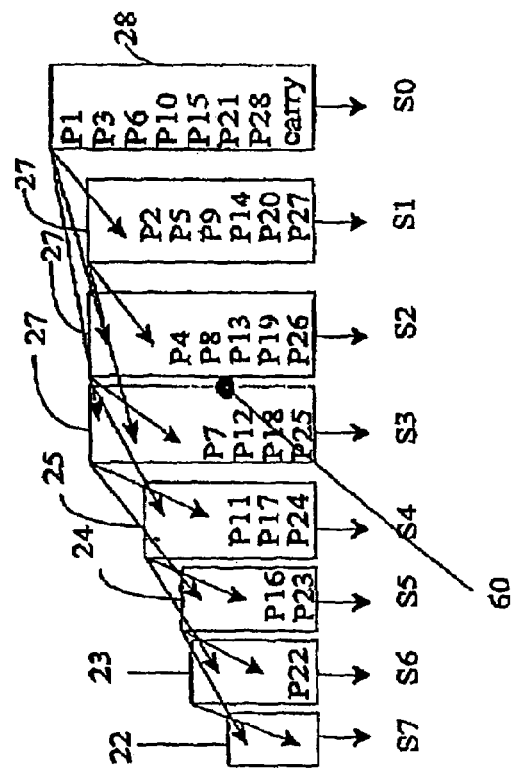

The module 60, represented in FIG. 14, comprises, set in cascaded fashion, a modulo-8 adder 28, with eight inputs and three outputs, three modulo-7 adders 27 and the adders 25, 24, 23 and 22. Supplied to the modulo-8 adder are the addenda P1, P3, P6, P10, P15, P21, P28 originated on the longest diagonal of the matrix of the circuit 10, and the carry signal CR coming from block 70 is moreover supplied to the remaining input.

Figure 15:
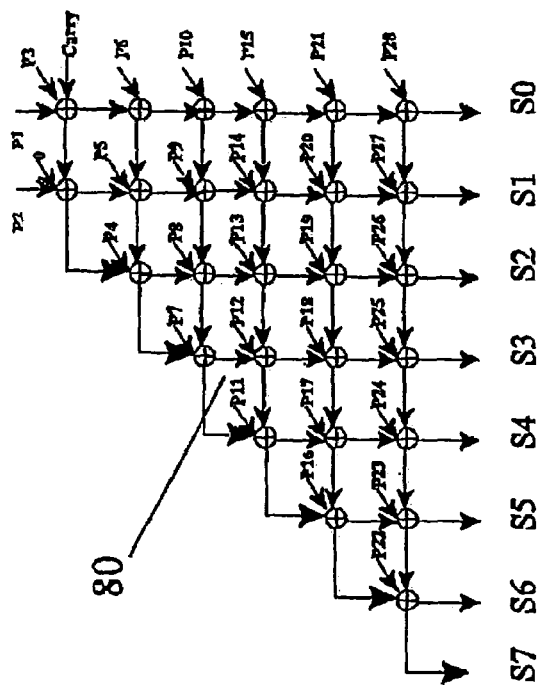

In FIG. 15, designated by the reference 80 is the detailed diagram of a circuit, alternative to the block 60, which carries out the partial sums on the partial products proceeding by rows.

Figure 16:
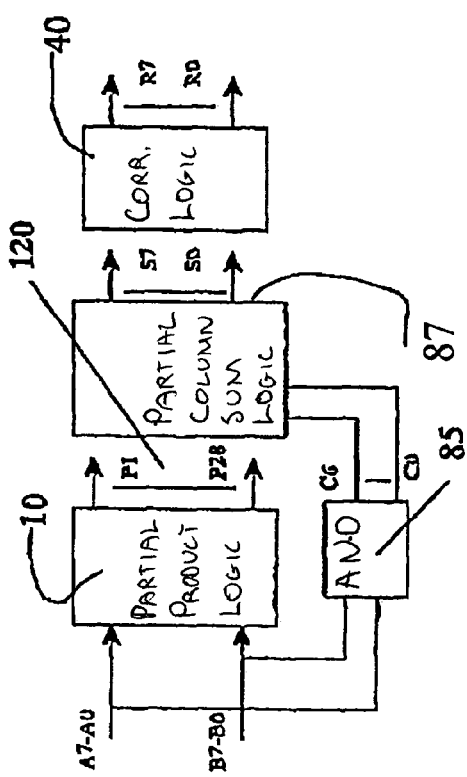
FIGS. 16 to 18 represent in greater detail a device that implements the method exemplified in FIG. 4.

Designated by 120 in FIG. 16 is a module that adopts the method of rounding by rows.

The module 120 hence comprises the circuit 10 for generation of the addenda of the partial products P1 ... P28, which are supplied to a block 87, which performs the partial sums by columns.

The block 87 receives also a bus C6 ... C0 of carry signals supplied by an appropriate block 85, which is used to calculate the partial sums S7 ... S0 rounding them by rows.

Figure 17:
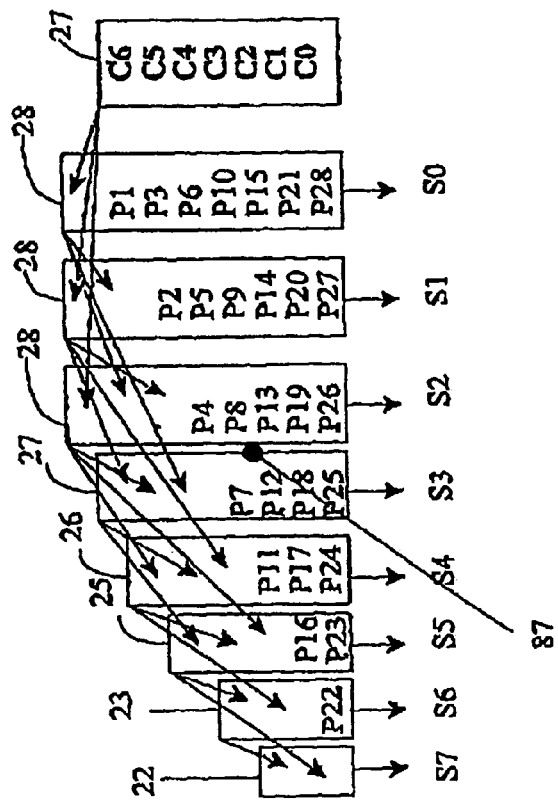

The block 87 is described in FIG. 17 and comprises, connected in cascaded fashion, one after another, an adder 27, three adders 28, a further adder 27, and then the adders 26, 25, 23, 22.

To the inputs of the first modulo-7 adder 27 there is sent the bus C6 ... C0 of carry signals, which represent the sums on the rows contained in the window RW of FIG. 4.

The unit 85, not represented in detail, produces the bus C6 ... C0 of carry signals according to the following relations:

C6=A0&B7
C5=(A0&B6)&(A1&B6)
C4=(A0&B5)&(A1&B5))&(A2&B5)
C3=(A0&B4)&(A1&B4))&(A2&B4))&(A3&B4)
C2=(A0&B3)&(A1&B3))&(A2&B3))&(A3&B3))& (A4&B3)
C1=(A0&B2)&(A1&B2))&(A2&B2))&(A3&B2))& (A4&B2)&(A5&B2)
C5=(A0&B1)&(A1&B1))&(A2&B1)&(A3&B1)& (A4&B1))&(A5&B1)&(A6&B1)

where the symbol & represents the one-bit AND operator.

In other words, the unit 85 implements the bit-by-bit AND operation on the rows belonging to the subset of addenda in the window RW, as defined for the method of rounding by rows illustrated with reference to FIG. 4, and supplies the values for each row in the form of the bus of carry signals C6 ... C0.

Figure 18:
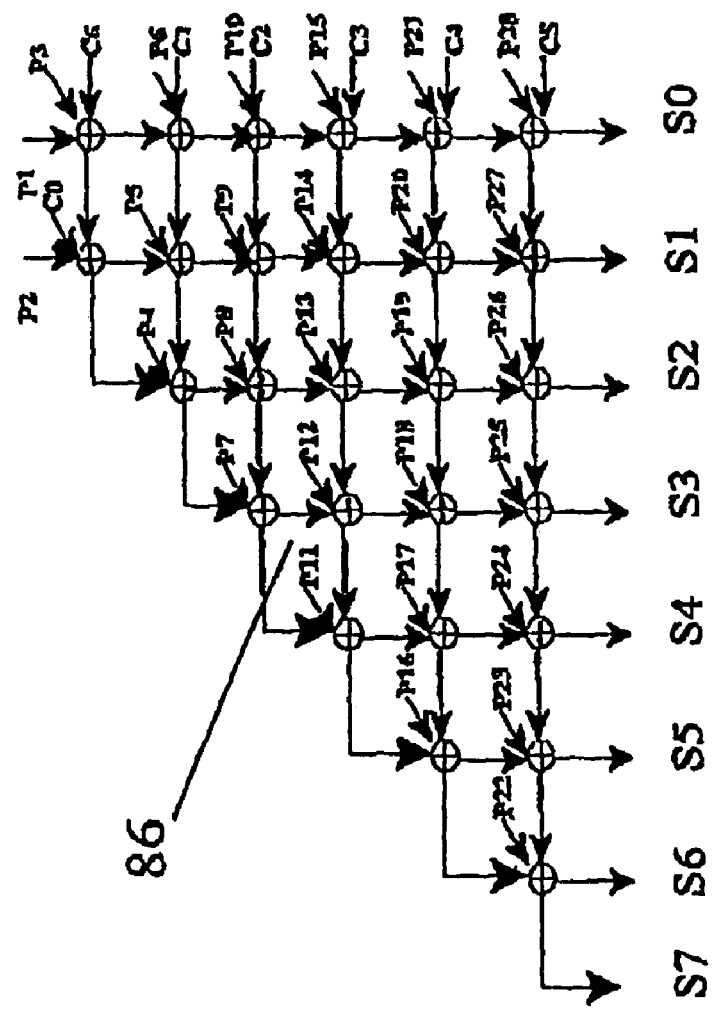

Represented in FIG. 18 is then a block 86, which performs the partial sums by rows, alternative to the block 87.

Described in what follows are conversion circuits for conversion from the floating-point binary encoding according to the IEEE754 standard to the binary encoding envisaged by the method according to the invention.

The signals M0 ... M22 represent the 23 bits of the mantissa according to the IEEE754 representation in single precision.

The signals E0 ... E7 represent the 8 bits of the exponent according to the IEEE754 representation in single precision.

Figure 20:
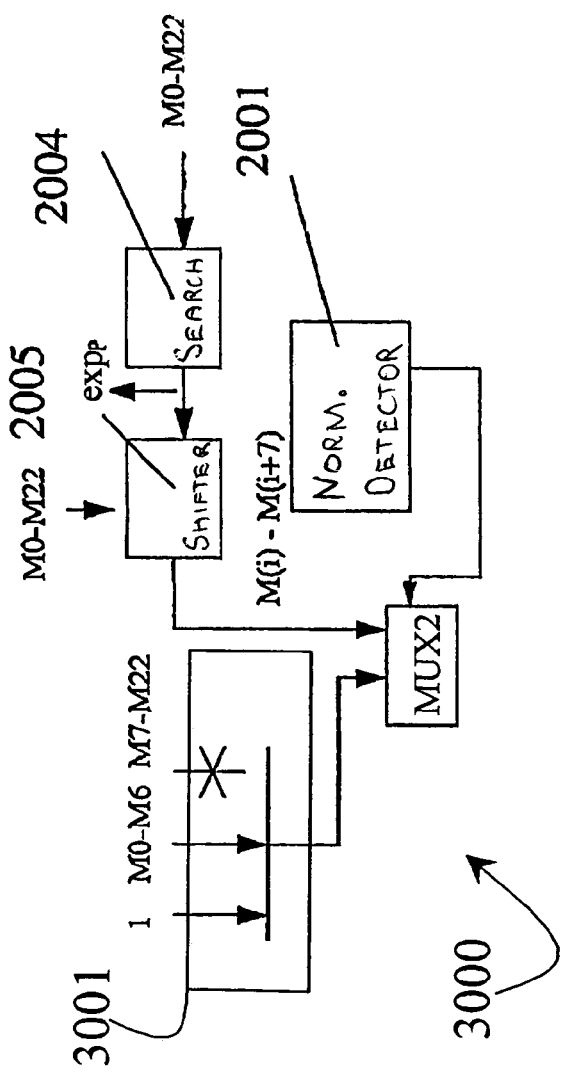
FIGS. 20 to 25 represent conversion encoding circuits that can be associated to the devices illustrated in FIGS. 5 to 19.

FIG. 20 represents a conversion circuit 3000 from the IEEE754 format to the representation according to the invention.

In the above circuit 3000 there is envisaged a multiplexer MUX2, which, in the case of a normalized value, receives at input the mantissa bits M0 ... M6 appropriately associated with the value one in a block 3001. The bits M7 ... M22 in said block 3001 are ignored in so far as, in the implementation of the method according to the invention described herein, for the mantissa MN only eight bits are used.

If the real number f at input is denormalized, the mantissa to be converted is sent to a search unit 2004, which searches for the first one present in the string of bits that constitutes the mantissa and supplies a position I thereof in the string to a group shifter 2005, which extracts the first 8 bits starting from said position I and sends them to the multiplexer MUX2.

Figure 21:
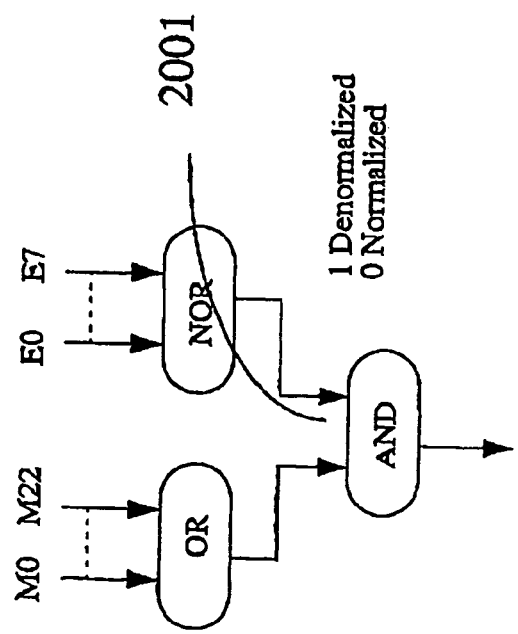

The output of the multiplexer MUX2 is driven by the output of a block 2001 represented in detail in FIG. 21, which receives at input the bits of mantissa M0 ... M22 and exponent E0 ... E7 and is designed to establish whether the floating-point number f is normalized or denormalized. The logic value 0 at output from the circuit 2001 means that the number is denormalized, whilst the logic value 1 at output from the circuit 2001 means that the number is normalized.

The index I which indicates the position in the bit string that constitutes the mantissa is moreover sent to a circuit 2000 for conversion of the exponent.

Figure 22:
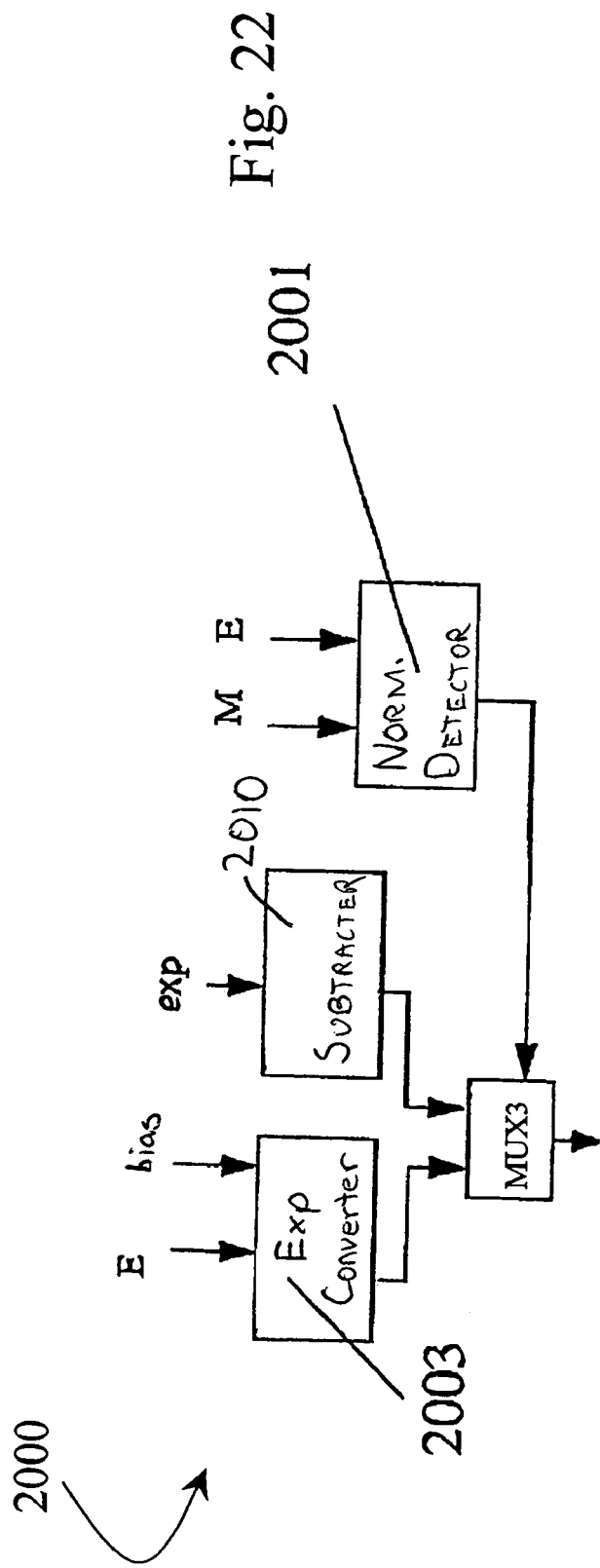

The conversion circuit 2000 is represented in FIG. 22 and comprises a module 2003 for the conversion of the exponent, the output of which is sent to a multiplexer MUX3 together with the output of a block 2010, which subtracts from the value of the exponent the index I found by the search unit 2004.

Figure 23:
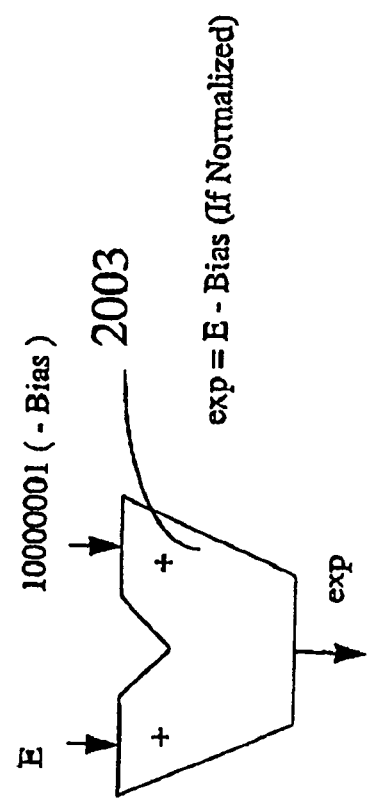

The unit 2003 for the conversion of the exponent is represented in FIG. 23 and consists basically of an adder that receives at input the exponent and the bias value.

In fact, the IEEE754 representation uses the following rules for encoding the exponent in the normalized and denormalized forms:

| | |
|---|---|
| E = Bias + exp | if normalized |
| E = 0 | if denormalized |

Then, in the converter for conversion from IEEE754 to completely normalized encoding, if the number at input is normalized there is added a bias value in twos complement, represented with 8 bits. Correction of the first one present in the mantissa requires correction of the exponent with a value +1. If E=0, the exponent is calculated by adding the contribution due to positioning of the mantissa and coming from the circuit 3000.

Hence, the unit 2003 supplies at output exp=E-Bias, whilst the unit 2010 supplies exp in the case of a denormalized number.

In a way similar to that of the circuit 3000, the multiplexer MUX3 is driven, for selecting between a normalized and a denormalized number, by a block 2001 that establishes whether the number to be converted is normalized or denormalized.

Figure 24:
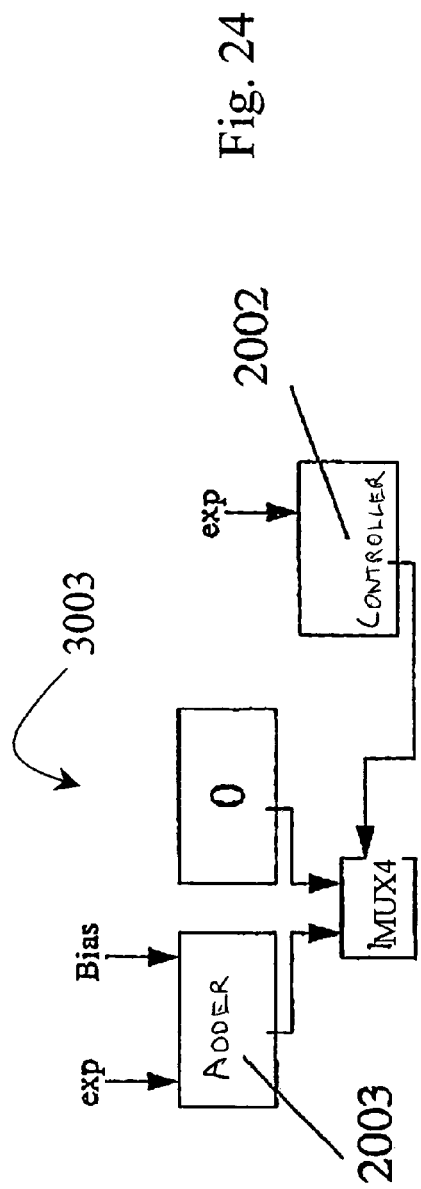

FIG. 24 represents a circuit 3003 for conversion of the exponent of completely normalized numbers into the IEEE754 standard.

The circuit 3003 comprises a block 2003, basically an adder, which receives at input the value of the base exponent exp and of bias, in this case positive. A multiplexer MUX4, which operates under the control of the circuit 2002, which likewise receives the exponent, chooses the output of the block 2003 or else a value zero in the case of a denormalized number.

Figure 25:
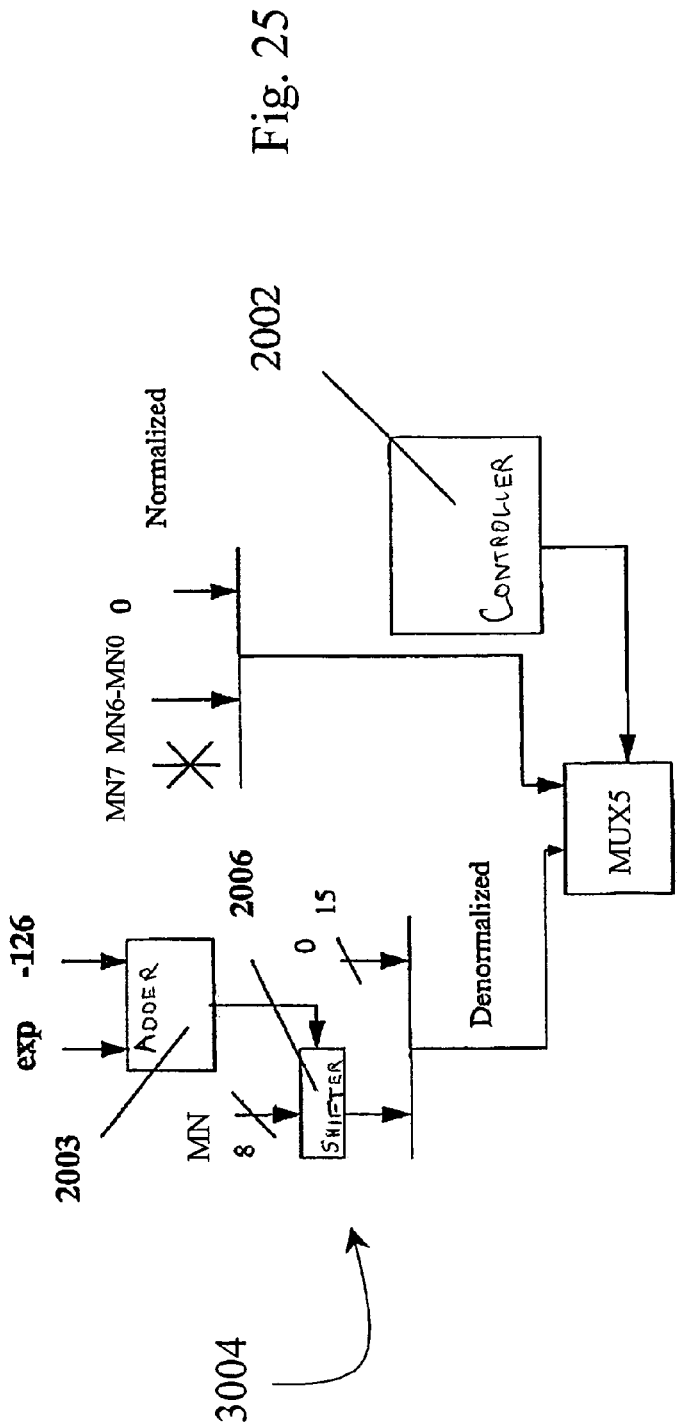

FIG. 25 represents a circuit 3004 for conversion of the mantissa of completely normalized numbers FN into the IEEE754 standard.

The above circuit 3004 comprises a unit 2003, which receives at input the exponent exp and a bias value equal to −126. A completely normalized number with exponent smaller than or equal to −126 is converted into the IEEE754 denormalized form: i.e., the exponent has the value −126, and the mantissa MN is scaled via a shift to the right by a number of positions equal to the difference between the exponent value and 126, by means of a shift-to-the-right unit 2006.

If the completely normalized number has a value such as to require an IEEE754 normalized encoding, the bit in the position MN7 is omitted, in so far as it is implicit.

The 23 bits of the IEEE754 mantissa are formed with the MN−1 bits of the completely normalized number FN, leaving the remaining 23-MN+1 bits at zero and decrementing the exponent by one.

A multiplexer MUX5 driven by a unit 2002 then selects the normalized or denormalized value.

Provided in what follows are the results of tests carried out on a multiplication unit that executes ten million random products, calculating the maximum error.

Figure 26:
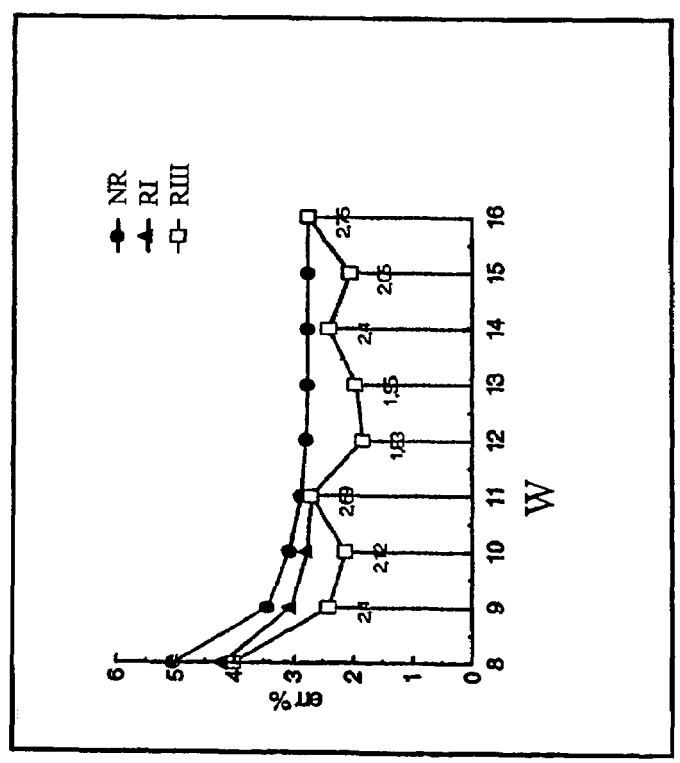

FIG. 26 represents the percentage error according to the width of the window W. The line NR indicates the line obtained using the method according to the invention without rounding, the line RI corresponds to the method with rounding by columns, and the line RII corresponds to the method with rounding by rows.

Figure 27:
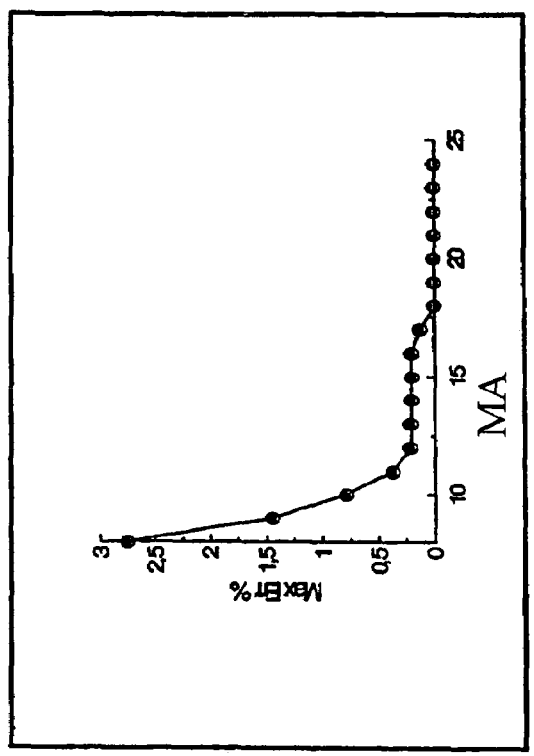
FIGS. 26 and 27 represent diagrams corresponding to operation of devices that implement the method according to the invention.

FIG. 27 represents the maximum percentage error according to the number MA of bits used for representing the mantissa MN in a multiplication unit for floating-point numbers according to the technique described herein.

As may be noted, for a value of MA from 8 bits onwards the percentage of maximum error remains below 2%, a value that is considered acceptable. In this condition, the bit-error rate of the system remains in any case within the threshold of −3 dB.

Simulations of this sort point towards a number NE of bits equal to 6 for the exponent EN.

The solution described above enables considerable advantages to be obtained as compared to known solutions. It will be appreciated that the main advantage of the solution according to the invention derives, in terms of area occupied on the chip and of power consumption, from the reduction in the number of circuits dedicated to the calculation of the partial products, obtained by means of an appropriate floating-point representation that enables just the most significant part of the partial products to be considered, hence with an acceptable truncation error.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

Of course, without prejudice to the principle of the invention, the details of implementation and the embodiments may vary widely with respect to what is described and illustrated herein, without thereby departing from the scope of the present invention.

The invention claimed is:

1. A multiplier device for generating, starting from a first binary digital signal and a second binary digital signal representing respective floating-point real numbers encoded in sign, exponent, and mantissa, an output signal representing a product of said real numbers, the device comprising:
a multiplication module for performing a multiplication on bits of said mantissas and supplying at output a set of addenda of partial products; and
a processing block for processing said partial products, which yields a product that is the result of the multiplication of the mantissas, wherein said multiplication module comprises a submatrix corresponding to a first subset of predetermined dimensions of the set of the addenda of partial products corresponding to most significant parts of the partial products, and wherein said multiplication module is further configured for rounding based on a second subset of the set of addenda, said second subset being external to said first subset.

2. The device according to claim 1 wherein the processing block includes an adder module for performing operations of partial sum on said addenda of the partial products and supplying at output respective partial sums.

3. The device according to claim 2 wherein the processing block includes a correction module, which corrects said partial sums generating corrected partial sums.

4. The device according to claim 1, wherein said multiplication module is configured for rounding by columns and performing a logic sum bit by bit, supplying a corresponding carry signal to a module that performs partial sums.

5. The device according to claim 1, wherein the multiplication module is configured for rounding by rows and performing a logic product bit by bit, supplying a corresponding carry signal to a module that performs partial sums.

6. The device according to claim 1, further comprising a sign-adder module for adding the signs and an exponent-adder module for adding the exponents.

7. The device according to claim 1, further comprising an exception module configured for detecting infinite or error values and for indicating them to the multiplier device by means of an appropriate exception signal.

8. The device according to claim 1 further comprising conversion circuits configured for subjecting said respective real numbers to conversion by converting them from floating-point numbers encoded according to the ILLL754-standard representation into numbers presenting said mantissa encoded in a completely normalized way.

9. The device according to claim 1 further comprising conversion circuits chosen from a group consisting of circuits for conversion from floating-point real numbers encoded in a standard way to real numbers encoded in a completely normalized way, and circuits for conversion from floating-point real numbers encoded in a completely normalized way to real numbers encoded in a standard way.

10. The device according to claim 1 wherein said device is included in a processor of a portable and/or wireless electronic device.

11. A computer-readable medium having code portions which can be directly loaded into the memory of a digital processor and that, when run on a computer, implement a method for generating, starting from a first binary digital signal and a second binary digital signal representing respective floating-point real numbers encoded in sign, exponent, and mantissa, an output signal representing a product of said real numbers, the product having a most significant part, the method comprising:
encoding in a completely normalized way the mantissas of said respective real numbers; and
multiplying the encoded mantissas by steps including:
determining partial products of the encoded mantissas by constructing a set of addenda;
calculating partial sums based on a first subset of the set of addenda, said first subset having a predetermined amplitude; and
rounding the partial sums based on a second subset of the set of addenda, said second subset being external to said first subset.

12. The computer-readable medium of claim 11 wherein the method implemented by the code portions includes preliminarily subjecting said respective floating-point real numbers to conversion between an ILLL754-standard representation and a representation in numbers presenting said mantissa encoded in a completely normalized way.

* * * * *

UNITED STATES PATENT AND TRADEMARK OFFICE
CERTIFICATE OF CORRECTION

| | |
|---|---|
| PATENT NO. | : 7,330,867 B2 |
| APPLICATION NO. | : 10/737697 |
| DATED | : February 12, 2008 |
| INVENTOR(S) | : Francesco Pappalardo et al. |

It is certified that error appears in the above-identified patent and that said Letters Patent is hereby corrected as shown below:

Column 14
Line 27, "ILLL754-standard" should read as -- IEEE754-standard --

Column 14
Line 63, "ILLL754-standard" should read as -- IEEE754-standard --

Signed and Sealed this

Twenty-ninth Day of July, 2008

JON W. DUDAS
*Director of the United States Patent and Trademark Office*